United States Patent
Kumagai et al.

(10) Patent No.: US 6,952,804 B2
(45) Date of Patent: Oct. 4, 2005

(54) VIDEO SUPPLY DEVICE AND VIDEO SUPPLY METHOD

(75) Inventors: Naoko Kumagai, Tokyo (JP); Hiroki Kotani, Tokyo (JP)

(73) Assignee: Sony Corporation, Tokyo (JP)

( * ) Notice: Subject to any disclaimer, the term of this patent is extended or adjusted under 35 U.S.C. 154(b) by 1048 days.

(21) Appl. No.: 09/783,569

(22) Filed: Feb. 15, 2001

(65) Prior Publication Data

US 2001/0052909 A1 Dec. 20, 2001

(30) Foreign Application Priority Data

Feb. 18, 2000 (JP) ........................................ 2000-046840

(51) Int. Cl.⁷ ................................................ G09G 5/00
(52) U.S. Cl. ...................... 715/723; 715/719; 725/135; 725/143
(58) Field of Search ................................ 715/716–726; 725/93, 105, 135, 143, 86, 98

(56) References Cited

U.S. PATENT DOCUMENTS

| | | | | | |
|---|---|---|---|---|---|
| 5,583,561 A | * | 12/1996 | Baker et al. | .................. | 725/93 |
| 6,154,600 A | * | 11/2000 | Newman et al. | ................ | 386/4 |
| 6,211,869 B1 | * | 4/2001 | Loveman et al. | ........... | 715/723 |
| 6,229,850 B1 | * | 5/2001 | Linzer et al. | .......... | 375/240.11 |
| 6,414,725 B1 | * | 7/2002 | Clarin et al. | ................ | 348/714 |
| 6,618,728 B1 | * | 9/2003 | Rail | ........................... | 707/101 |
| 2003/0091329 A1 | * | 5/2003 | Nakata et al. | ................ | 386/52 |

\* cited by examiner

Primary Examiner—Tadesse Hailu
(74) Attorney, Agent, or Firm—Bell, Boyd & Lloyd LLC

(57) ABSTRACT

A video providing device (30) comprises network I/Fs (37), (38) for transmitting/receiving a video to an external network, a high-quality video server (32) for storing the video as a regular editing video, a high-compressed video streamer (35) for storing the video as a rough editing video, a high-compressed video server (31) for reading out and transmitting the rough editing video on the basis of a video transmission request from a production (51) included in the external network (20), and a high-quality video server (32) for extracting and transmitting a part of the regular editing video to a post production (40) on the basis of the result of editing processing from the production (51). Thus, the video providing device (30) receives, for example, a video prepared by the production (51) and supplies a part of the video to the post production (40).

4 Claims, 4 Drawing Sheets

| EDITING POINT | | MATERIAL | EFFECT | |
|---|---|---|---|---|
| IN | OUT | | PATTERN | DURATION |
| 00:02:34:12 | 00:02:35:03 | aaa-1 | out | 00:00:00:00 |
| 00:07:54:27 | 00:07:58:14 | aaa-1 | wipe | 00:00:03:00 |
| 02:04:41:12 | 02:05:02:20 | aaa-2 | dissolve | 00:00:05:00 |
| 02:05:10:00 | 02:06:03:18 | aaa-2 | | |
| ⋮ | ⋮ | ⋮ | ⋮ | ⋮ |

VIDEO SUPPLY DEVICE AND VIDEO SUPPLY METHOD

BACKGROUND OF THE INVENTION

1. Field of the Invention

This invention relates to a video supply device and a video supply method for providing videos through a network.

2. Description of the Related Art

Conventionally, videos are provided from a contents providing company which holds all kinds of contents (videos, music and so on) to a clip producing company which prepares a video clip or the like using a part of the contents.

When distributing videos to the contents providing company to the clip producing company, it is often the case that the contents providing company allows viewing of a static image representing a video on the network so that the clip producing company views the static image on the network. The contents providing company often allows viewing of a static image compressed at a high compression rate on the network.

When the clip producing company wants to receive provision of the video including the static image viewed on the network, the clip producing company requests the video providing company for delivery of a sample video by means of telephone or facsimile. Then, the contents providing company records the sample video of the whole video time onto a tape cassette and sends it to the company which receives the provision. The clip producing company to which the sample video has been sent designates a video portion included in the sample video and requests the contents providing company for provision of the designated video portion. Then, the contents providing company records the video portion of the designated time period onto a tape cassette and sends it to the clip producing company.

As described above, it is often that case that the static image and the sample video allowed to be viewed on the network by the contents providing company are images of low resolution compressed at a high compression rate, and that the video portion of the time period designated by the clip producing company is a non-compressed video of high resolution.

In the conventional distribution of videos to companies, designation of the time of a video portion to be used by the clip producing company on the network and distribution of a video portion of high resolution are not carried out in consideration of the data quantity of the video and the network band.

Moreover, when sending a video of low resolution of a whole video time from the contents providing company to the clip producing company, or when sending a video portion of a designated time period from the contents providing company to the clip producing company, the video recorded on a tape cassette is sent by hand or by means of postal service.

SUMMARY OF THE INVENTION

Thus, in view of the foregoing status of the art, it is an object of the present invention to provide a video supply device and a video supply method which enables construction of a system for allowing a video of a whole video time between companies and distributing a video portion on the network.

A video supply device according to the present invention comprises: transmitting/receiving means for transmitting/receiving a video to/from an external network; regular editing video storage means for storing the video as a regular editing video; rough editing video storage means for storing the video as a rough editing video that is different from the regular editing video; rough editing control means for controlling the transmitting/receiving means to read the rough editing video stored in the rough editing video storage means on the basis of a video transmission request from a rough editing equipment included in the external network and transmit the rough editing video to the rough editing equipment; and regular editing control means for controlling the transmitting/receiving means to extract a part of the regular editing video stored in the regular editing video storage means on the basis of the result of editing processing from the rough editing equipment and transmit the extracted part to a regular editing equipment.

A video supply method according to the present invention comprises the steps of: storing a received video as a regular editing video and storing the received video as a rough editing video that is different from the regular editing video; reading out the rough editing video on the basis of a video transmission request from a rough editing equipment included in an external network and transmitting the rough editing video to the rough editing equipment; and extracting a part of the regular editing video on the basis of the result of editing processing from the rough editing equipment and transmitting the extracted part to a regular editing equipment.

DESCRIPTION OF THE PREFERRED EMBODIMENTS

A preferred embodiment of the present invention will now be described in detail with reference to the drawings.

Figure 1:
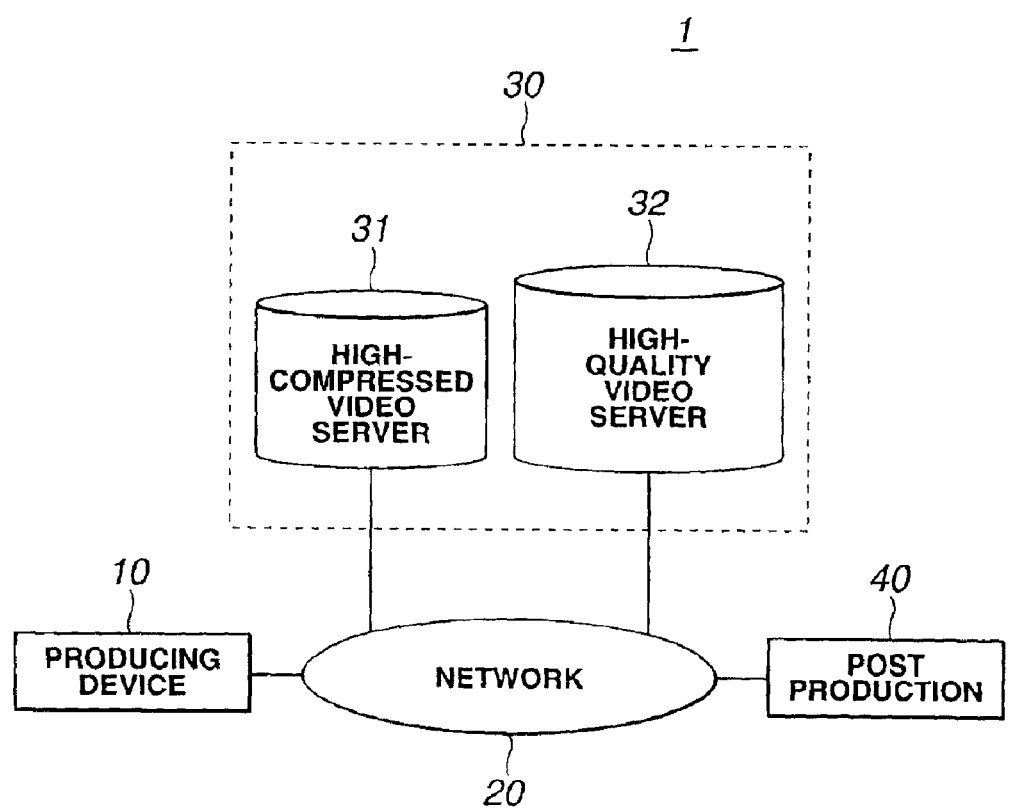
FIG. 1 is a block diagram showing the structure of a video providing system according to the present invention.

The present invention is applied to, for example, a video providing system 1 as shown in FIG. 1.

The video providing system 1 includes a contents producing device 10 for preparing and holding a video, a video providing device 30 having a high-compressed video server 31 and a high-quality video server 32 which are connected to the contents producing device 10 via a network 20, and a post production 40 for carrying out editing processing by using a high-quality video.

Figure 2:
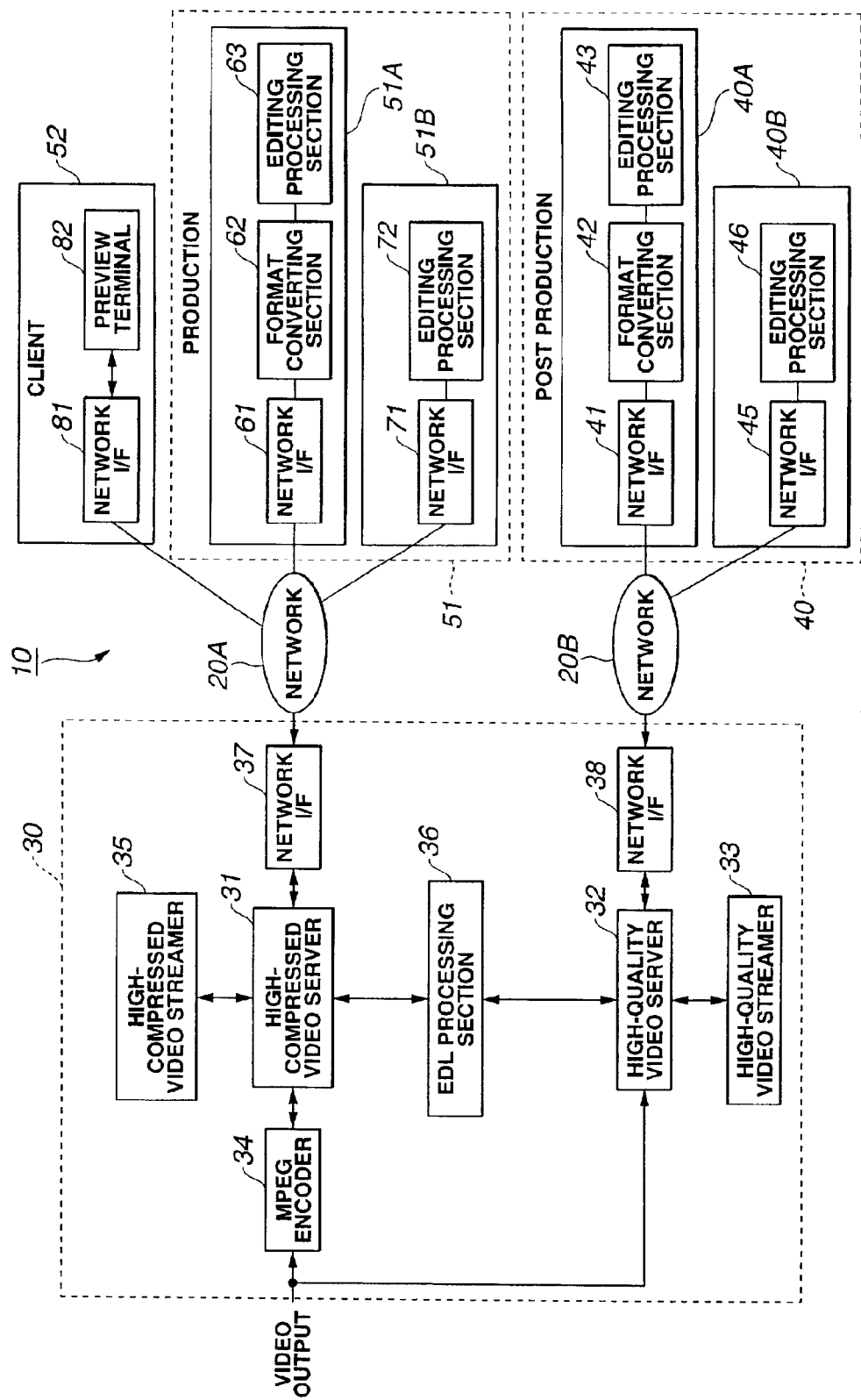
FIG. 2 is a block diagram showing the structure of a contents producing device, a video providing device and a post production which constitute the video providing system according to the present invention.

The contents producing device 10 includes a production 51 and a client 52 which are connected to a network 20A, as shown in FIG. 2. The production 51 includes a plurality of productions 51A, 51B. The production 51A and the production 51B are productions of different types arranged at different locations and are adapted for carrying out different processing.

The production 51A has a network I/F 61 for transmitting a video or the like to the network 20A, a format converting section 62 for converting the format of the video or the like, and an editing processing section 63 for carrying out rough editing processing, which will be described later. The production 51B has a network I/F 71 for transmitting a video or the like to the network 20A and an editing processing section 72 for carrying out rough editing processing, which will be described later. Hereinafter, the "production 51" is used as a general term for the production 51A and the production 51B.

The production 51 has, for example, a shooting function, and generates contents made up of a non-compressed video or music of high quality with time information added thereto. The production 51 holds movies and the like as well as videos shot by the production 51 itself.

The production 51 has a video transmission function for transmitting the video generated by the shooting function to the video providing device 30 via the network 20. The production 51 has a viewing function for viewing a high-compressed video stored in the video providing device 30, and a rough editing function (including correction processing) for carrying out rough editing processing using a high-compressed video that is viewed and designated. The production 51 also has an EDL transmission function for carrying out rough editing processing to prepare EDL (edit decision list) data and transmitting the EDL data to the video providing device 30.

The client 52 is made of, for example, a personal computer, and has a preview function for previewing the result of rough editing processing at the client 52 as it is operated by a user. The client 52 has a network I/F 81 for transmitting a video or the like via the network 20A, and a preview terminal 82 for previewing the result of editing at the client 52, as shown in FIG. 2.

The client 52 uses preview terminal 82 to present to the user the result of rough editing processing transmitted from the video providing device 30 via the network I/F 81. Thus, the client 52 generates correction request information and editing agreement information in accordance with the reference to the preview by the user operating the preview terminal 82, and transmits the generated information to the video providing device 30.

The post production 40 is connected to the video providing device 30 via a network 20B, as shown in FIGS. 1 and 2. The post production 40 includes a plurality of post productions 40A, 40B. The post production 40A and the post production 40B are productions of different types arranged at different locations and are adapted for carrying out different processing.

The post production 40A has a network I/F 41 for transmitting a video or the like to the network 20B, a format converting section 42 for converting the format of the video or the like, and an editing processing section 43 for carrying out regular editing processing, which will be described later. The post production 40B has a network I/F 45 for transmitting a video or the like to the network 20B, and an editing processing section 46 for carrying out regular editing processing, which will be described later.

The editing processing sections 43, 46 carry out regular editing processing using a regular editing video, while the editing processing sections 63, 72 of the production 51 carry out rough editing processing using a rough editing video. The post production 40 carries out editing processing of the contents based on the result of rough editing processing, and carries out regular editing processing as it is designated by the production 51.

Hereinafter, the "post production 40" is used as a general term for the post production 40A and the post production 40B.

Such a post production 40 has a video receiving function for receiving a high-quality video from the video providing device 30 via the network 20. The post production 40 also has a regular editing function using the high-quality video transmitted from the video providing device 30.

Such a post production 40 receives the high-quality video from the video providing device 30 by using the network I/F and carries out regular editing processing at the editing processing section 43, 46, thus preparing a video clip.

The video providing device 30 receives the video from the production 51 of the contents producing device 10 via the network 20A, then stores the video as a high-quality video into a high-quality video streamer 33 via a high-quality video server 32, and also stores the video as a high-compressed video into a high-compressed video streamer 35 via an MPEG (Moving Picture Experts Group) encoder 34 and a high-compressed video server 31, as shown in FIG. 2. The video providing device 30 has an EDL processing section 36 for preparing EDL data, a network I/F 37 for transmitting the high-compressed video or the like, and a network I/F 38 for transmitting the high-quality video.

The videos stored in the high-compressed video streamer 35 and the high-quality video streamer 33 need not be videos transmitted from the production 51 via the network 20A. For example, the video providing device 30 may store a video received via another network or a video stored on a tape cassette in advance.

The MPEG encoder 34 is supplied with the video from the production 51, then compresses the video in accordance with the MPEG system so as to generate a high-compressed video, and outputs the high-compressed video to the high-compressed video server 31. When additional information such as time information is entered to the video, the MPEG encoder 34 outputs the video as it is to the high-compressed video server 31.

The high-compressed video server 31 stores the high-compressed video from the MPEG encoder 34 into the high-compressed video streamer 35 as a video for rough editing at the production 51, and manages the stored high-compressed video.

The high-compressed video streamer 35 is made up of, for example, a VCR unit. The high-compressed video streamer 35 stores the high-compressed video supplied from the high-compressed video server 31 onto a tape-like recording medium and outputs the stored high-compressed video in accordance with a reading request from the high-compressed video server 31.

The network I/F 37 transmits the high-compressed video from the high-compressed video server 31 to the production 51 or the client 52 via the network 20A in accordance with a predetermined data transmission system. In this case, the network 20A connected to the network I/F 37 may be a network having a narrower band than the network 20B, which will be described later. The network I/F 37 also carries out processing in accordance with a predetermined data transmission system so as to receive the EDL data from the production 51 and outputs the EDL data to the high-compressed video server 31.

The high-compressed video server 31 carries out processing to transmit the high-compressed video of the whole video time to the production 51 via the network I/F 37 in response to a high-compressed video transmission request from the production 51. Also, the high-compressed video server 31 is supplied with the EDL data from the production 51 via the network 20A and the network I/F 37 and outputs the EDL data to the EDL processing section 36.

The high-quality video server 32 is supplied with the video from the production 51 and stores the supplied video into the high-quality video streamer 33 as a video for regular editing at the post production 40. The video stored in the high-quality video streamer 33 is stored into the high-quality video streamer 33 as a video of higher quality than the video stored in the high-compressed video streamer 35 and is managed by the high-quality video server 32.

The high-quality video streamer 33 is made up of, for example, a VCR unit. The high-quality video streamer 33 stores the high-quality video supplied from the high-quality video server 32 onto a tape-like recording medium and outputs the stored high-quality video in accordance with a reading request from the high-quality video server 32. It is desirable that the possible storage capacity of the high-quality video streamer 33 is greater than that of the high-compressed video streamer 35.

The network I/F 38 transmits the high-quality video from the high-quality video server 32 to the post production 40 via the network 20B in accordance with a predetermined data transmission system. In this case, it is desirable that the network 20B connected to the network I/F 38 is a network having a broader band than the network 20A in view of the fact that the video used for regular editing has a greater data quantity than the video used for rough editing. Also, the network I/F 38 carries out processing in accordance with a predetermined data transmission system so as to receive the EDL data from the production 51 and outputs the EDL data to the high-quality video server 32.

The high-quality video server 32 is supplied with the EDL data from the production 51 and outputs the supplied EDL data to the EDL processing section 36. The high-quality video server 32 carries out processing to read out the high-quality video from the high-quality video streamer 33 in accordance with the EDL data from the EDL processing section 36 and to extract a part of the high-quality video. The high-quality video server 32 outputs the extracted high-quality video to the post production 40 designated by the production 51, via the network I/F 38 and the network 20B.

The EDL processing section 36 is supplied with the EDL data generated by rough editing processing from the high-compressed video server 31. The EDL processing section 36 generates EDL data for extracting the high-quality video used for regular editing processing at the post production 40, using the EDL data generated by rough editing processing, and outputs the generated EDL data to the high-quality video server 32.

The EDL data prepared by rough editing processing is EDL data prepared by using the high-compressed video. The EDL processing section 36 carries out processing to convert the EDL data prepared by rough editing processing into the EDL data for the high-quality video used for regular editing processing.

The EDL data includes the material name of a video as an object of editing processing, IN point indicating the editing start position and OUT point indicating the editing end position such that editing points in extracting the video are expressed by time information (time code), special effect pattern indicating the type of special effect at the IN point and OUT point, and effect duration indicating the duration of the special effect.

Figures 3, 4:
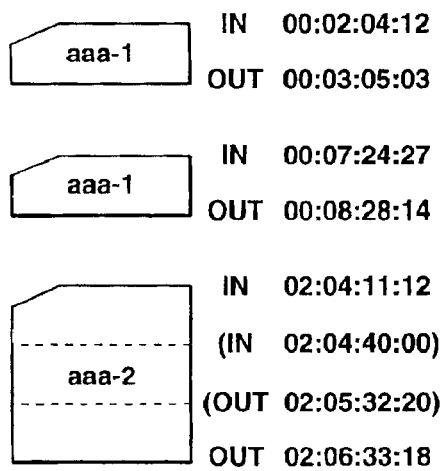
FIG. 3 illustrates an example of EDL data.
FIG. 4 illustrates extraction of a part of a video at a high-quality video server using EDL data.

An example of the EDL data prepared by the EDL processing section 36 on the basis of the EDL data in rough editing processing is shown in FIG. 3. In FIG. 3, videos are arranged in the temporally preceding order from the upper stage toward the lower stage. The EDL data has the IN point and OUT point expressed by hour, minute, second and frame number with colons (:), and includes the name (aaa-1, aaa-2) of material as an object of editing processing using the IN point and OUT point, the special effect pattern (cut, wipe, dissolve) at the editing position of each material, and the duration of the special effect.

The high-quality video server 32 carries out processing to add a margin before and after the IN point and OUT point and to extract the resultant video, in order to deal with changes of the IN point and OUT point and changes of the special effect at the time of regular editing processing at the post production 40. In this case, for example, the high-quality video server 32 uses an image located 30 seconds before the IN point as an extraction start point, and uses an image located 20 seconds after the OUT point as an extraction end point. The high-quality video server 32 may change the quantity of the margin provided for each material in accordance with the special effect made on each material, or may change the extraction start point and the extraction end point in accordance with the special effect.

When extracting the high-quality video by using EDL data as shown in FIG. 3, the high-quality video server 32 adds a margin of 30 seconds to the IN point and OUT point of each material (aaa-1, aaa-2) and further adds a margin of 30 seconds to the IN point and OUT point of the material aaa-2 which has the special effect of "dissolve" at the IN point, as shown in FIG. 4.

The processing carried out by the video providing system 1 will now be described with reference to the flowchart of FIG. 5.

Figure 5:
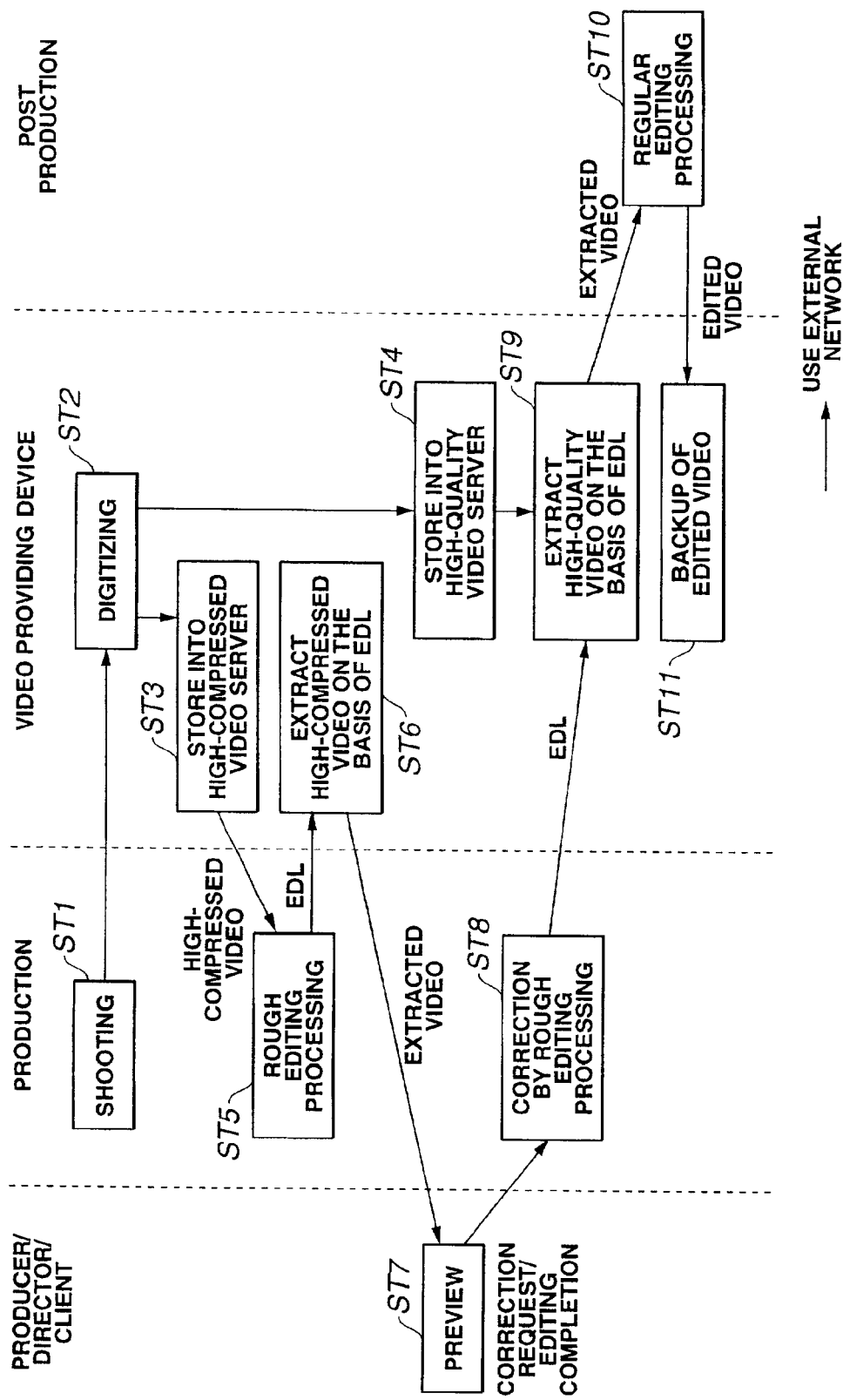
FIG. 5 is a flowchart for explaining the processing procedure of the video providing system according to the present invention.

In the flowchart of FIG. 5, first at step ST1, the production 51 transmits a video shot thereby to the video providing device 30 via the network 20A.

At the next step ST2, the video providing device 30 receives the video from the contents producing device 10 and carries out digitizing processing including preprocessing to store the video into the high-compressed video streamer 35 via the high-compressed video server 31 and preprocessing to store the video into the high-quality video streamer 33 via the high-quality video server 32. In this case, the MPEG encoder 34 carries out processing to compress the video in accordance with the MPEG system and to prepare a high-compressed video.

At step ST3, the high-compressed video server 31 carries out processing to store the high-compressed video prepared by the MPEG encoder 34 into the high-compressed video streamer 35. At step ST4, the high-quality video server 32 carries out processing to store the video from the contents producing device 10 into the high-quality video streamer 33 as a high-quality video. In this case, the high-compressed video server 31 and the high-quality video server 32 may carry out processing to convert the format or the like, if necessary.

In the state where the high-compressed video is stored in the high-compressed video streamer 35, the high-compressed video server 31 transmits at any time a static image representing the material stored in the high-compressed video streamer 35 to the production 51 via the network 20A in accordance with a viewing request from the production 51. Then, in accordance with a high-compressed video transmission request from the production 51, the high-compressed video server 31 transmits the high-compressed video of the whole video time indicating the designated material to the production 51 via the network 20A.

At step ST5, the production 51 carries out rough editing processing using the high-compressed video transmitted thereto via the network 20A, thus preparing EDL data. In this case, the production prepares EDL data related to the IN point, OUT point and the special effect for each material made up of the high-compressed video. Then, the production 51 transmits the EDL data for each material to the video providing device 30.

At step ST6, the high-compressed video server 31 carries out processing to read out the high-compressed video stored in the high-compressed video streamer 35 and to extract a part of each material on the basis of the EDL data from the production 51. Thus, the high-compressed video server 31 prepares an extracted video after rough editing, which is made by temporally connecting parts of a plurality of materials, and transmits the extracted video to the client 52 via the network 20A. The high-compressed video server 31 also outputs the EDL data prepared at step ST5 to the EDL processing section 36.

At step ST7, the client 52 displays the extracted video after rough editing, for example, on the preview terminal 82, thus previewing the result of rough editing processing at the production 51. In accordance with the result of rough editing, the client 52 provides correction request information or editing agreement information with respect to rough editing processing at the production 51, to the production 51 via the network 20A.

At step ST8, when the correction request information is transmitted to the production 51 from the client 52, the production 51 carries out rough editing processing again in accordance with the correction request information, thus correcting the EDL data. The production 51 carries out processing to transmit the corrected EDL data to the high-quality video server 32 via the network 20A. When the editing agreement information is transmitted to the production 51, the production 51 transmits the EDL data prepared at step ST5 to the video providing device 30 via the network 20A. The video providing device 30 carries out processing to store the EDL data for the extracted video, which is previewed and agreed by the client 52, into the EDL processing section 36.

At step ST9, the high-quality video server 32 carries out processing to read out the high-quality video stored in the high-quality video streamer 33 on the basis of the EDL data prepared by the production 51 and stored in the EDL processing section 32, and to prepare an extracted video to be used for regular editing processing. In this case, the high-quality video server 32 carries out processing to add a margin as described above and carries out processing to read out the high-quality video from the high-quality video streamer 33. Then, the high-quality video server 32 controls the network I/F 38, thus transmitting the extracted video to the post production 40 via the network 20B.

At step ST10, the post production 40 carries out regular editing processing using the extracted video transmitted at step ST9. In this case, the post production 40 carried out processing to provide a special effect for the extracted video and to combine the respective materials, thus preparing a desired video clip. The post production 40 transmits the video clip prepared by regular editing processing to the video providing device 30 via the network 20B.

At step ST11, the high-quality video server 32 is supplied with the video clip from the post production 40 via the network 20B and stores the video clip, for example, into the high-quality video streamer 33, thus making backup of the video clip.

In the video providing system 1, which carries out such processing, when distributing a part of the high-quality video, a high-compressed video is viewed by the high-compressed video server 31 of the video providing device 30, and only a video portion that is requested to be transmitted can be transmitted by the high-quality video server 32. Thus, the network efficiency can be improved. Therefore, the video providing system 1 constitutes a system for viewing a video of a whole video time between companies and distributing a video portion on the network.

Also, with the video providing system 1, since viewing of a material stored in the video providing device 30 and transmission of an extracted video extracted from a high-quality video can be carried out by using the network, distribution of a video to the post production 40 can be more efficient than in the conventional system.

In the above description of the video providing system 1, a compressed video is stored in the high-compressed video streamer 35 as a high-compressed video, and a non-compressed video is stored in the high-quality video streamer 33 as a high-quality video. However, a video from the contents producing device 10 may be stored as it is into the high-quality video streamer 33 and a part of the video obtained by thinning the video from the contents producing device 10 on the frame basis may be stored into the high-compressed video streamer 35. In such a video providing system 1, the video obtained by thinning on the frame basis can be transmitted from the high-compressed video streamer 35 to the production 51 for carrying out rough editing processing via the network 20, and the network efficiency can be improved similarly to the foregoing example.

As another example, a video compressed at a predetermined compression rate by the MPEG encoder 34 may be stored into the high-compressed video streamer 35 as a rough editing video, and a video compressed at a lower compression rate than the predetermined compression rate by the MPEG encoder 34 may be stored into the high-quality video streamer 33 as a regular editing video. In such a case, too, the network efficiency can be improved similarly to the foregoing example by reducing the quantity of data to be transmitted from the video providing device 30 to the production 51.

As still another example, a video of predetermined image quality may be stored into the high-compressed video streamer 35 as a rough editing video, and a video of higher quality than the predetermined image quality may be stored into the high-quality video streamer 33 as a regular editing video. For example, a video which requires 8 bits per pixel is stored into the high-compressed video streamer 35 and a video which requires 64 bits per pixel is stored into the high-quality video streamer 33. In such a case, too, the network efficiency can be improved similarly to the foregoing example by reducing the quantity of data to be transmitted from the video providing device 30 to the production 51.

As described above in detail, in the video supply device and the video supply method according to the present invention, it is possible to store a received video as a regular editing video and also as a rough editing video, read out and transmit the rough editing video to a rough editing equipment on the basis of a video transmission request from the rough editing equipment included in an external network, and extract and transmit a part of the regular editing video to a regular editing equipment on the basis of the result of editing processing from the rough editing equipment. Therefore, when distributing a part of the regular editing video, the rough editing video is viewed and only a requested video portion can be transmitted to the regular editing equipment. Thus, a system for viewing a video of a whole video time between companies and distributing a video portion on the network can be constructed.

What is claimed is:

1. A video supply device comprising:

transmitting/receiving means for transmitting/receiving a video to/from an external network;

regular editing video storage means for storing the video as a regular editing video;

rough editing video storage means for storing the video as a rough editing video that is different from the regular editing video;

rough editing control means for controlling the transmitting/receiving means to read the rough editing video stored in the rough editing video storage means on the basis of a video transmission request from a rough editing equipment included in the external network and transmit the rough editing video to the rough editing equipment; and regular editing control means for controlling the transmitting/receiving means to extract a part of the regular editing video stored in the regular editing video storage means on the basis of a result of editing processing from the rough editing equipment and transmit the extracted part to a regular editing equipment, wherein the transmitting/receiving means receives the result of editing processing which expresses an editing start position and an editing end position as time information from the rough editing equipment via the external network, wherein the regular editing control means extracts a part of the regular editing video on the basis of the result of editing processing received by the transmitting/receiving means, and wherein the regular editing control means decides an extraction start position located temporally before the editing start position and an extraction end position located temporally after the editing end position on the basis of the result of editing processing from the transmitting/receiving means, and extracts a video from the extraction start position to the extraction end position.

2. The video supply device as claimed in claim 1, wherein the regular editing control means determines the type of editing processing on the basis of the result of editing processing from the rough editing equipment, and decides the extraction start position and the extraction end position in accordance with the type of editing processing.

3. A video supply method comprising the steps of:

storing a received video as a regular editing video and storing the received video as a rough editing video that is different from the regular editing video;

reading out the rough editing video on the basis of a video transmission request from a rough editing equipment included in an external network and transmitting the rough editing video to the rough editing equipment; and extracting a part of the regular editing video on the basis of the result of editing processing from the rough editing equipment and transmitting the extracted part to a regular editing equipment, wherein the result of editing processing which expresses an editing start position and an editing end position as time information is received from the rough editing equipment via the external network, wherein a part of the regular editing video is extracted on the basis of the received result of editing processing, and wherein an extraction start position located temporally before the editing start position and an extraction end position located temporally after the editing end position are decided on the basis of the result of editing processing from the rough editing equipment, and a video from the extraction start position to the extraction end position is extracted.

4. The video supply method as claimed in claim 3, wherein the type of editing processing is determined on the basis of the result of editing processing from the rough editing equipment, and the extraction start position and the extraction end position are decided in accordance with the type of editing processing.

* * * * *